US012549392B2

(12) United States Patent
Deshpande et al.

(10) Patent No.: US 12,549,392 B2
(45) Date of Patent: Feb. 10, 2026

(54) SYSTEM FOR ENABLING MODIFICATION OF DATA AND ENDORSEMENTS OF SMART CONTRACTS WITHIN A DISTRIBUTED TRUST COMPUTING NETWORK

(71) Applicant: BANK OF AMERICA CORPORATION, Charlotte, NC (US)

(72) Inventors: Nimish Ravindra Deshpande, Maharashtra (IN); Bharat Indrakanti, Telangana (IN); Gautam Ravi, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 115 days.

(21) Appl. No.: 18/381,740

(22) Filed: Oct. 19, 2023

(65) Prior Publication Data
US 2025/0132934 A1 Apr. 24, 2025

(51) Int. Cl.
*H04L 9/00* (2022.01)
*H04L 9/06* (2006.01)

(52) U.S. Cl.
CPC .............. *H04L 9/50* (2022.05); *H04L 9/0643* (2013.01)

(58) Field of Classification Search
CPC ........ H04L 9/50; H04L 9/0643; H04L 9/3239
See application file for complete search history.

(56) References Cited

U.S. PATENT DOCUMENTS

| 10,476,847 | B1 | 11/2019 | Smith |
| 10,666,426 | B2 | 5/2020 | Roets |
| 10,783,190 | B2 | 9/2020 | Qiu |
| 10,831,452 | B1 * | 11/2020 | Hunter ...................... G06F 8/65 |
| 10,855,475 | B1 * | 12/2020 | Leach ................... H04L 9/0637 |
| 11,354,727 | B2 | 6/2022 | Yao |
| 11,397,919 | B1 | 7/2022 | Thiagrajan |
| 11,557,008 | B2 * | 1/2023 | Cali ....................... G06Q 50/06 |
| 11,575,518 | B2 | 2/2023 | Srivastava |
| 11,588,619 | B2 | 2/2023 | Revankar |
| 11,611,445 | B2 | 3/2023 | Baykaner |
| 11,706,297 | B2 | 7/2023 | Thurau |
| 11,811,955 | B1 * | 11/2023 | Hurwitz ................ H04L 9/3236 |
| 11,854,038 | B1 * | 12/2023 | Mahesh ............. G06Q 30/0226 |
| 11,860,858 | B1 * | 1/2024 | McKervey ............ H04L 9/3297 |

(Continued)

*Primary Examiner* — Aravind K Moorthy
(74) *Attorney, Agent, or Firm* — Moore & Van Allen PLLC; Anup Iyer

(57) ABSTRACT

Enabling modifications to smart contracts within a distributed trust computing network platform. Enablement of smart contract modifications is made possible by generating a smart contract and an associated hash value and storing such in an intermediate data block held within a staging area. The intermediate data block is held in the staging area until (i) all the parties accept the smart contract and (ii) the conditions are met and the smart contract self-executes. As long as the intermediate data block remains in the staging area, the data stored therein is subject to modification. Once the parties to the smart contract accept the smart contract (and/or modifications to the smart contact) and the conditions are met, such that the smart contact self-executes, the intermediate data block is synthesized/transformed into an immutable data block which is stored within a distributed ledger of the corresponding distributed trust computing network.

17 Claims, 6 Drawing Sheets

(56) References Cited

U.S. PATENT DOCUMENTS

| | | | |
|---|---|---|---|
| 11,914,616 B1* | 2/2024 | Philipson | H04L 67/12 |
| 12,125,004 B2 | 10/2024 | Ognjanovic | |
| 12,231,588 B1* | 2/2025 | Dintchev | G06F 9/547 |
| 12,244,681 B2* | 3/2025 | Park | H04L 65/80 |
| 12,277,553 B2* | 4/2025 | Sharma | G06Q 30/0609 |
| 12,292,722 B2* | 5/2025 | Lu | G05B 19/042 |
| 2017/0279774 A1* | 9/2017 | Booz | G06Q 20/0658 |
| 2018/0123779 A1 | 5/2018 | Zhang | |
| 2018/0137465 A1 | 5/2018 | Batra | |
| 2018/0189753 A1* | 7/2018 | Konda | H04L 9/14 |
| 2018/0227116 A1* | 8/2018 | Chapman | G06F 21/64 |
| 2018/0343175 A1* | 11/2018 | Bathen | G06F 16/1834 |
| 2019/0014124 A1* | 1/2019 | Reddy | H04L 41/5019 |
| 2019/0036778 A1* | 1/2019 | Bathen | H04L 41/5006 |
| 2019/0058709 A1* | 2/2019 | Kempf | G06F 21/64 |
| 2019/0081796 A1* | 3/2019 | Chow | G06Q 20/34 |
| 2019/0102163 A1* | 4/2019 | Witherspoon | G06F 8/65 |
| 2019/0108516 A1* | 4/2019 | Jawaharlal | H04L 9/3239 |
| 2019/0165930 A1* | 5/2019 | Castinado | H04L 9/3239 |
| 2019/0180276 A1* | 6/2019 | Lee | H04L 9/3247 |
| 2019/0180291 A1* | 6/2019 | Schmeling | G16H 20/10 |
| 2019/0244207 A1* | 8/2019 | Samuel | G06Q 20/405 |
| 2019/0253239 A1 | 8/2019 | Shao | |
| 2019/0253434 A1* | 8/2019 | Biyani | H04L 9/3297 |
| 2019/0325044 A1 | 10/2019 | Gray | |
| 2019/0334920 A1* | 10/2019 | Kelly | H04L 9/3239 |
| 2019/0354614 A1* | 11/2019 | Chui | G06F 16/23 |
| 2019/0370634 A1* | 12/2019 | Ferreira Moreno | H04L 63/0428 |
| 2019/0378069 A1* | 12/2019 | Deshpande | G06Q 10/06315 |
| 2019/0392392 A1* | 12/2019 | Elden | H04L 9/3239 |
| 2020/0027089 A1* | 1/2020 | Kuchar | H04L 9/0637 |
| 2020/0051011 A1* | 2/2020 | Dasari | H04L 9/0637 |
| 2020/0075056 A1* | 3/2020 | Yang | G11B 20/10527 |
| 2020/0076573 A1* | 3/2020 | Deshpande | G06F 16/2465 |
| 2020/0089671 A1* | 3/2020 | Padmanabhan | G06Q 20/02 |
| 2020/0090140 A1* | 3/2020 | Seol | G06Q 50/01 |
| 2020/0090208 A1* | 3/2020 | Reichenbach | G06Q 40/08 |
| 2020/0097927 A1* | 3/2020 | Groarke | G06Q 20/3825 |
| 2020/0118131 A1* | 4/2020 | Diriye | H04L 9/3239 |
| 2020/0127832 A1* | 4/2020 | Ebrahimi | H04L 63/0815 |
| 2020/0142682 A1* | 5/2020 | Marks | G06F 8/65 |
| 2020/0143337 A1* | 5/2020 | Conroy | G06Q 20/382 |
| 2020/0151718 A1* | 5/2020 | Yao | G06Q 20/405 |
| 2020/0167503 A1* | 5/2020 | Wei | G06F 21/602 |
| 2020/0169387 A1* | 5/2020 | Wei | G06F 21/6272 |
| 2020/0193255 A1* | 6/2020 | Manamohan | G06K 19/0723 |
| 2020/0213127 A1* | 7/2020 | Maniyar | G06F 16/2379 |
| 2020/0226285 A1* | 7/2020 | Bulleit | G06F 21/33 |
| 2020/0226678 A1* | 7/2020 | Magnabosco | H04L 9/0637 |
| 2020/0380505 A1* | 12/2020 | Shah | H04L 9/321 |
| 2021/0073287 A1* | 3/2021 | Hunter | H04L 63/123 |
| 2021/0119994 A1* | 4/2021 | Shekh-Yusef | H04L 63/102 |
| 2021/0149880 A1 | 5/2021 | Ivkushkin | |
| 2021/0201318 A1* | 7/2021 | Wylie | H04L 63/08 |
| 2021/0303553 A1* | 9/2021 | Zanpure | G06F 16/2365 |
| 2021/0304089 A1* | 9/2021 | Hill | G06Q 10/0631 |
| 2021/0329009 A1* | 10/2021 | Chen | H04L 63/126 |
| 2021/0344791 A1* | 11/2021 | Birch | H04M 3/22 |
| 2021/0359840 A1* | 11/2021 | Wang | H04L 9/3239 |
| 2021/0374696 A1* | 12/2021 | Chau | H04L 47/827 |
| 2021/0397445 A1* | 12/2021 | Ahuja | H04L 9/50 |
| 2022/0012149 A1* | 1/2022 | Doshi | G06F 11/0757 |
| 2022/0020008 A1 | 1/2022 | Bai | |
| 2022/0060514 A1* | 2/2022 | Hu | H04L 63/061 |
| 2022/0107937 A1* | 4/2022 | Adivi | G06N 20/00 |
| 2022/0122062 A1* | 4/2022 | Mayblum | G06Q 20/381 |
| 2022/0138742 A1 | 5/2022 | Katrych | |
| 2022/0141198 A1* | 5/2022 | Lundgren | H04L 63/045 713/164 |
| 2022/0147988 A1* | 5/2022 | Alexa | G06Q 20/3827 |
| 2022/0156725 A1* | 5/2022 | Iwama | G06Q 20/3676 |
| 2022/0188298 A1 | 6/2022 | Maurer | |
| 2022/0230174 A1* | 7/2022 | Khare | H04L 9/3297 |
| 2022/0237267 A1* | 7/2022 | Diaz | H04L 9/3239 |
| 2022/0245202 A1* | 8/2022 | Chaudhry | H04L 63/123 |
| 2022/0247583 A1 | 8/2022 | Spoto | |
| 2022/0270146 A1* | 8/2022 | Diedrich | H04L 9/3236 |
| 2022/0292463 A1* | 9/2022 | Brook | H04L 9/32 |
| 2022/0318399 A1 | 10/2022 | Rodler | |
| 2022/0348363 A1* | 11/2022 | Colson | B29D 99/0021 |
| 2022/0366505 A1* | 11/2022 | Kumar | H04L 9/0637 |
| 2022/0374875 A1* | 11/2022 | Madisetti | G06Q 20/389 |
| 2022/0391895 A1* | 12/2022 | Weber | G06Q 20/3823 |
| 2022/0417008 A1* | 12/2022 | Shrivastava | H04L 9/3263 |
| 2022/0417044 A1* | 12/2022 | Goel | G06F 11/1451 |
| 2023/0062434 A1* | 3/2023 | Wagner | G06Q 20/405 |
| 2023/0107197 A1* | 4/2023 | Sharma | G06Q 30/0185 705/71 |
| 2023/0119552 A1* | 4/2023 | Doshi | H04L 47/783 709/226 |
| 2023/0128004 A1* | 4/2023 | Garg | G06Q 20/3829 705/71 |
| 2023/0130086 A1* | 4/2023 | Verma | G06Q 30/01 705/50 |
| 2023/0130347 A1* | 4/2023 | Ravinathan | G06Q 20/3829 705/71 |
| 2023/0136805 A1* | 5/2023 | Morais | G06Q 20/401 705/75 |
| 2023/0177167 A1* | 6/2023 | Chan | H04L 63/20 726/1 |
| 2023/0177625 A1* | 6/2023 | Dickerson | G06Q 50/18 705/80 |
| 2023/0186306 A1* | 6/2023 | Mattison | G06Q 30/0258 705/64 |
| 2023/0196318 A1* | 6/2023 | Rosen | G06Q 20/3829 705/71 |
| 2023/0229742 A1* | 7/2023 | Antonioli | G06F 21/16 726/26 |
| 2023/0237499 A1* | 7/2023 | Padmanabhan | G06F 16/27 705/304 |
| 2023/0262092 A1* | 8/2023 | Griffin | H04L 63/102 726/26 |
| 2023/0281585 A1* | 9/2023 | Kechik | G06F 16/20 705/51 |
| 2023/0281604 A1* | 9/2023 | Robell | G06Q 30/018 |
| 2023/0281609 A1* | 9/2023 | Khare | G06Q 20/36 705/69 |
| 2023/0281638 A1* | 9/2023 | Kaiser | G06Q 30/018 |
| 2023/0325758 A1* | 10/2023 | Rakshit | G06Q 10/08355 700/116 |
| 2023/0334036 A1* | 10/2023 | Covaci | H04L 9/3273 |
| 2023/0351051 A1* | 11/2023 | Woo | G06Q 50/18 |
| 2023/0351407 A1* | 11/2023 | Hu | G06Q 20/3825 |
| 2023/0367566 A1* | 11/2023 | Dubrofsky | G06F 8/427 |
| 2024/0007284 A1* | 1/2024 | Osborn | G06F 16/164 |
| 2024/0020355 A1* | 1/2024 | Binder | H04L 9/50 |
| 2024/0020648 A1* | 1/2024 | Robinson | G06Q 10/1057 |
| 2024/0020682 A1* | 1/2024 | Castagna | G06Q 20/3674 |
| 2024/0039938 A1* | 2/2024 | Yadav-Ranjan | H04L 63/1425 |
| 2024/0073017 A1* | 2/2024 | Fruchter | H04L 9/0869 |
| 2024/0089128 A1* | 3/2024 | Vialar | G06F 21/554 |
| 2024/0089247 A1* | 3/2024 | Singh | H04L 9/50 |
| 2024/0095316 A1* | 3/2024 | Kim | G06F 21/64 |
| 2024/0095756 A1* | 3/2024 | Perkins | G06Q 30/018 |
| 2024/0104653 A1* | 3/2024 | Suto | G06Q 20/1235 |
| 2024/0106652 A1* | 3/2024 | Wang | H04L 9/3247 |
| 2024/0113902 A1* | 4/2024 | Michaelis | H04L 9/0825 |
| 2024/0127201 A1* | 4/2024 | Wagner | G06Q 20/223 |
| 2024/0144381 A1* | 5/2024 | Martine | G16H 40/67 |
| 2024/0152915 A1* | 5/2024 | Canney | G06Q 20/065 |
| 2024/0152917 A1* | 5/2024 | Singh | H04L 9/50 |
| 2024/0171393 A1* | 5/2024 | Bathen | H04L 9/3247 |
| 2024/0243931 A1* | 7/2024 | Alkarboly | H04L 9/50 |
| 2024/0259269 A1* | 8/2024 | Karabey | H04L 9/3239 |
| 2024/0265387 A1* | 8/2024 | Mehrhoff | G06Q 30/06 |
| 2024/0267412 A1* | 8/2024 | Banerjee | G06F 16/901 |
| 2024/0303637 A1* | 9/2024 | Cohler | H04L 9/3239 |
| 2024/0320636 A1* | 9/2024 | Manevich | G06Q 20/3829 |
| 2024/0338685 A1* | 10/2024 | McDonough | G06Q 20/38215 |
| 2024/0362646 A1* | 10/2024 | Ezrielev | G06Q 20/3829 |
| 2024/0386106 A1* | 11/2024 | Sethia | G06F 21/577 |

(56) References Cited

U.S. PATENT DOCUMENTS

2024/0428255 A1   12/2024  Ito
2025/0053455 A1*  2/2025  Obstfeld ............... G06F 9/5038
2025/0077625 A1*  3/2025  Coleman ................ G06F 21/64

* cited by examiner

SYSTEM FOR ENABLING MODIFICATION OF DATA AND ENDORSEMENTS OF SMART CONTRACTS WITHIN A DISTRIBUTED TRUST COMPUTING NETWORK

FIELD OF THE INVENTION

The present invention is related generally to managing smart contracts within a distributed trust computing network and, more specifically, enabling modifications to smart contracts through use of a staging area which stores intermediate data blocks prior synthesizing/transforming the data blocks into immutable data blocks stored on the distributed trust computing network.

BACKGROUND

A distributed trust computing network, such as blockchain network like, includes multiple decentralized computing devices commonly referred to as nodes. Nodes stored distributed ledgers which comprise data blocks formed within the ledger in a chain-like manner. In order to add a data block to a distributed ledger, the data contained therein undergoes a consensus process in which multiple nodes making up the distributed trust computing network reach consensus on the validity of the data. Characteristic of distributed trust computing, once the data is stored on the network (i.e., a data block is added to a distributed ledger), the data is immutable (i.e., the data cannot be altered or deleted).

A smart contract is one form of data that is commonly stored within a distributed ledger of a distributed trust computing network. A smart contract is a self-executing and self-enforcing contract between multiple parties with the terms of the contract/agreement directly written into software code. Smart contracts are run on a blockchain platform and automatically execute when predefined conditions are met.

However, in certain instances a need exists to provide the ability to modify data once the data has been added to a data block and, in some instances, undergone consensus but prior to adding the data block to a distributed ledger. Such modification of data within a data block prior to inclusion within a distributed ledger, would lessen the burden placed on the nodes since less data blocks would need to be created, undergo consensus and added to the distributed ledger. An example of such a need is evident in smart contracts in which conditions which need to be met in order for the contract to self-execute may change over time.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program products and the like provide for enabling modifications to smart contracts within a distributed trust computing network platform. Specifically, embodiments provide for generating a smart contract and an associated hash value, which are stored in an intermediate data block held within a staging area. The intermediate data block is held in the staging area until (i) all the parties accept the smart contract and (ii) the conditions are met and the smart contract self-executes. As long as the intermediate data block remains in the staging area, the data stored therein is subject to modification (e.g., conditions and/or parties can be changed, added or deleted).

Once the parties to the smart contract accept the smart contract (and, in some embodiments modifications to the smart contact) and the conditions are met, such that the smart contact self-executes, the intermediate data block is synthesized (i.e., transformed) into an immutable data block which is stored within a distributed ledger of the corresponding distributed trust computing network. Once the data block has been synthesized/transformed, the data stored therein is no longer modifiable and, thus, is deemed to be immutable.

In specific embodiments of the invention, in the event that a party to the smart contract cancels the smart contract or otherwise declines the conditions defined by the smart contract including modifications to the conditions, the intermediate data block is removed from the staging area and corresponding hash value is released. This means that the hash value is subject to subsequent re-generation by the corresponding hash algorithm and can be re-used as the hash value for a subsequently generated data block.

A system for managing a smart contract in a distributed trust computing network defines first embodiments of the invention. The system includes a distributed trust computing network that includes a plurality of decentralized nodes. Each decentralized node including first memory and at least one first computing processor device in communication with the first memory. The first memory of the decentralized nodes is configured to store one or more distributed ledgers, with each distributed ledger including a plurality of immutable data blocks that store data. The system additionally includes a staging area in communication with the distributed trust computing network and including second memory and at least one second computing processor device in communication with the second memory. In addition, the system includes a computing platform that includes third memory and at least one third computing processor device in communication with the third memory. The third memory stores smart contract generator and management application that is executable by one or more of the at least one third computing processor devices. Smart contract generator and management application is configured to receive, from an initiating party, one or more initial conditions related to a smart contract being formed between the initiating party and one or more other parties and generate (i) the smart contract based on the one or more initial conditions and (ii) a first hash value for the smart contract. Smart contract generator and management application is configured to generate an intermediate data block comprising the smart contract and the first hash value and store the intermediate data block in the second memory of the staging area. The intermediate data block is modifiable while stored in the second memory of the staging area.

In additional specific embodiments of the system, the smart contract generator and management application is further configured to, in response to (i) acceptance of the smart contract by the one or more other parties, and (ii) execution of the smart contract based on fulfillment of the one or more initial conditions, synthesize the intermediate data block into an immutable data block stored on a distributed ledger from amongst the one of more distributed ledgers.

In other specific embodiments of the system, the smart contract generator and management application is further configured to receive, from the initiating party or one of the one or more other parties, a user input indicating cancellation or declination of the smart contract, and in response to receiving the user input, remove the intermediate block from the second memory of the staging area and release the first hash value for subsequent re-generation and re-use as a hash value for a later generated data block.

In still further specific embodiments of the system, the smart contract generator and management application is further configured to receive consensus on the intermediate data block from at least two of the plurality of decentralized nodes. Consensus is received prior to storing the intermediate data block in the second memory of the staging area.

Moreover, in additional specific embodiments of the system, the smart contract generator and management application is further configured to, prior to executing the smart contract, (a) receive, from the initiating party or one of the one or more parties, one or more updates to the smart contract including (i) one or more modifications to the one or more initial conditions of the smart contract and/or (ii) one or more additional conditions related to the smart contract, (b) update the smart contract based on the one or more updates, (c) generate a second hash value for the one or more updates and (d) modify the intermediate data block stored in the second memory of the staging area to include the updated smart contract and the second hash value. In related specific embodiments of the system, the smart contract generator and management application is further configured to synthesize the modified intermediate data block into an immutable data block stored on a distributed ledger from amongst the one of more distributed ledgers in response to (i) acceptance of (a) the smart contract by the one or more other parties and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions. In further related specific embodiments of the system, the smart contract generator and management application is further configured to receive, from a party to the smart contract affected by the one or more updates, a user input indicating declination of at least one of the one or more updates to the smart contract, and, in response to receiving the user input, remove the at least one of the one or more updates from the intermediate data block stored in the second memory of the staging area and release the second hash value for subsequent re-generation and re-use as a hash value for a later generated data block.

A computer-implemented method for managing a smart contract in a distributed trust computing network defines second embodiments of the invention. The method is executable by one or more computing processor devices. The method includes receiving, from an initiating party, one or more initial conditions related to a smart contract being formed between the initiating party and one or more other parties and generating (i) the smart contract based on the one or more initial conditions and (ii) a first hash value for the smart contract. The method further includes generating an intermediate data block comprising the smart contract and the first hash value and storing the intermediate data block in the second memory of a staging area. The intermediate data block is modifiable while stored in the second memory of the staging area and the staging area is in communication with a distributed trust computing network, which includes a plurality of decentralized nodes, each decentralized node configured to store in memory one or more distributed ledgers, each distributed ledger including a plurality of immutable data blocks that store data.

In specific embodiments of the computer-implemented method, the method further includes, in response to (i) acceptance of the smart contract by the one or more other parties, and (ii) execution of the smart contract based on fulfillment of the one or more initial conditions, synthesizing the intermediate data block into an immutable data block stored on a distributed ledger from amongst the one of more distributed ledgers.

In other specific embodiments of the computer-implemented method, the method further includes receiving, from the initiating party or one of the one or more other parties, a user input indicating cancellation or declination of the smart contract and, in response to receiving the user input, removing the intermediate data block from the memory of the staging area and releasing the first hash value for subsequent re-generation and re-use as a hash value for a later generated data block.

In still further specific embodiments of the computer-implemented method, the method further includes receiving consensus on the intermediate data block from at least two of the plurality of decentralized nodes. Consensus is received prior to storing the intermediate data block in the memory of the staging area.

Moreover, in other specific embodiments of the computer-implemented method, the method further includes, prior to executing the smart contract, (a) receiving, from the initiating party or one of the one or more parties, one or more updates to the smart contract including (i) one or more modifications to the one or more initial conditions of the smart contract, and/or (ii) one or more additional conditions related to the smart contract, (b) updating the smart contract based on the one or more updates, (c) generating a second hash value for the one or more updates and (d) modifying the intermediate data block stored in the second memory of the staging area to include the updated smart contract and the second hash value. In related specific embodiments of the computer-implemented method, the method further includes synthesizing the modified intermediate data block into an immutable data block stored on a distributed ledger from amongst the one of more distributed ledgers in response to (i) acceptance of (a) the smart contract by the one or more other parties, and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions. In further related specific embodiments of the computer-implemented method, the method includes receiving, from a party to the smart contract affected by the one or more updates, a user input indicating declination of at least one of the one or more updates to the smart contract and, in response to receiving the user input, removing the at least one of the one or more updates from the intermediate data block and releasing the second hash value for subsequent re-generation and re-use as a hash value for a later generated data block.

A computer program product including a non-transitory computer-readable medium defines third embodiments of the invention. The computer-readable medium includes sets of codes for causing one or more computing devices to receive, from an initiating party, one or more initial conditions related to a smart contract being formed between the initiating party and one or more other parties and generate (i)

the smart contract based on the one or more initial conditions and (ii) a first hash value for the smart contract. The sets of codes further cause the one or more computing devices to generate an intermediate data block comprising the smart contract and the first hash value and store the intermediate data block in the second memory of a staging area. The intermediate data block is modifiable while stored in the second memory of the staging area. The staging area is in communication with a distributed trust computing network comprising a plurality of decentralized nodes, each decentralized node configured to store in memory one or more distributed ledgers, with each distributed ledger including a plurality of immutable data blocks that store data.

In specific embodiments of the computer program product, the sets of codes further cause the one or more computing devices to, in response to (i) acceptance of the smart contract by the one or more other parties, and (ii) execution of the smart contract based on fulfillment of the one or more initial conditions, synthesize the intermediate data block into an immutable data block stored on a distributed ledger from amongst the one of more distributed ledgers.

In other specific embodiments of the computer program product, the sets of codes further cause the one or more computing devices to receive, from the initiating party or one of the one or more other parties, a user input indicating cancellation or declination of the smart contract and, in response to receiving the user input, remove the intermediate data block from the memory of the staging area and releasing the first hash value for subsequent re-generation and re-use as a hash value for a later generated data block.

In still further specific embodiments of the computer program product, the sets of codes further cause the one or more computing devices to receive consensus on the intermediate data block from at least two of the plurality of decentralized nodes. Consensus is received prior to storing the intermediate data block in the memory of the staging area.

Moreover, in further specific embodiments of the computer program product, the sets of codes further cause the one or more computing devices to, prior to executing the smart contract, (a) receive, from the initiating party or one of the one or more parties, one or more updates to the smart contract including (i) one or more modifications to the one or more initial conditions of the smart contract, and/or (ii) one or more additional conditions related to the smart contract, (b) update the smart contract based on the one or more updates, (c) generate a second hash value for the one or more updates, and (d) modify the intermediate data block stored in the second memory of the staging area to include the updated smart contract and the second hash value. In related specific embodiments of the computer program product, the sets of codes further cause the one or more computing devices to synthesize the modified intermediate data block into an immutable data block stored on a distributed ledger from amongst the one of more distributed ledgers in response to (i) acceptance of (a) the smart contract by the one or more other parties, and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions.

Thus, according to embodiments of the invention, which will be discussed in greater detail below, the present invention provides for enabling modifications to smart contracts within a distributed trust computing network platform. Specifically, enablement of smart contract modifications is made possible by generating a smart contract and an associated hash value and storing such in an intermediate data block held within a staging area. The intermediate data block is held in the staging area until (i) all the parties accept the smart contract and (ii) the conditions are met and the smart contract self-executes. As long as the intermediate data block remains in the staging area, the data stored therein is subject to modification (e.g., conditions and/or parties can be changed, added or deleted). Once the parties to the smart contract accept the smart contract (and, in some embodiments modifications to the smart contact) and the conditions are met, such that the smart contact self-executes, the intermediate data block is synthesized (i.e., transformed) into an immutable data block which is stored within a distributed ledger of the corresponding distributed trust computing network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
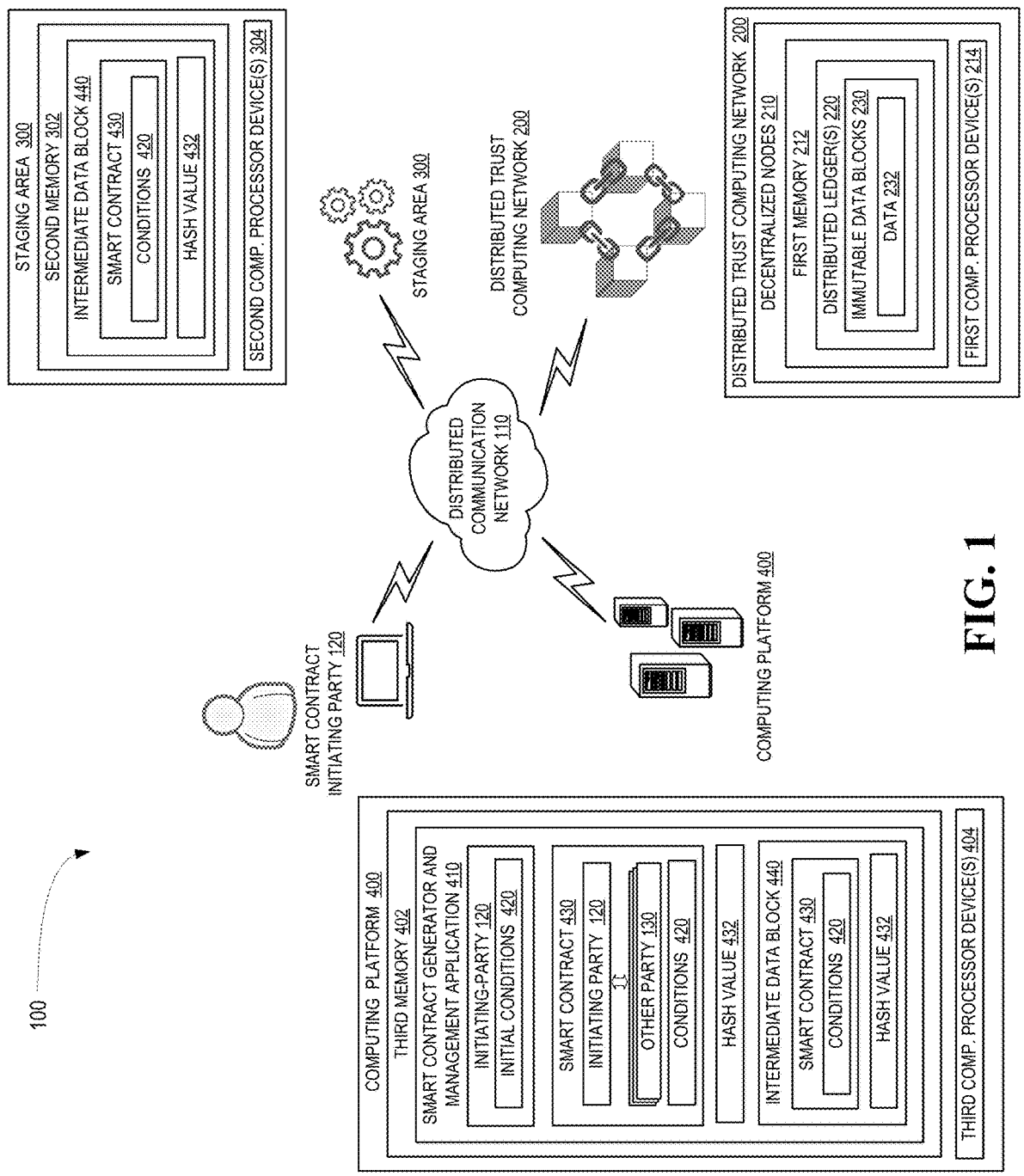
Figure 2:
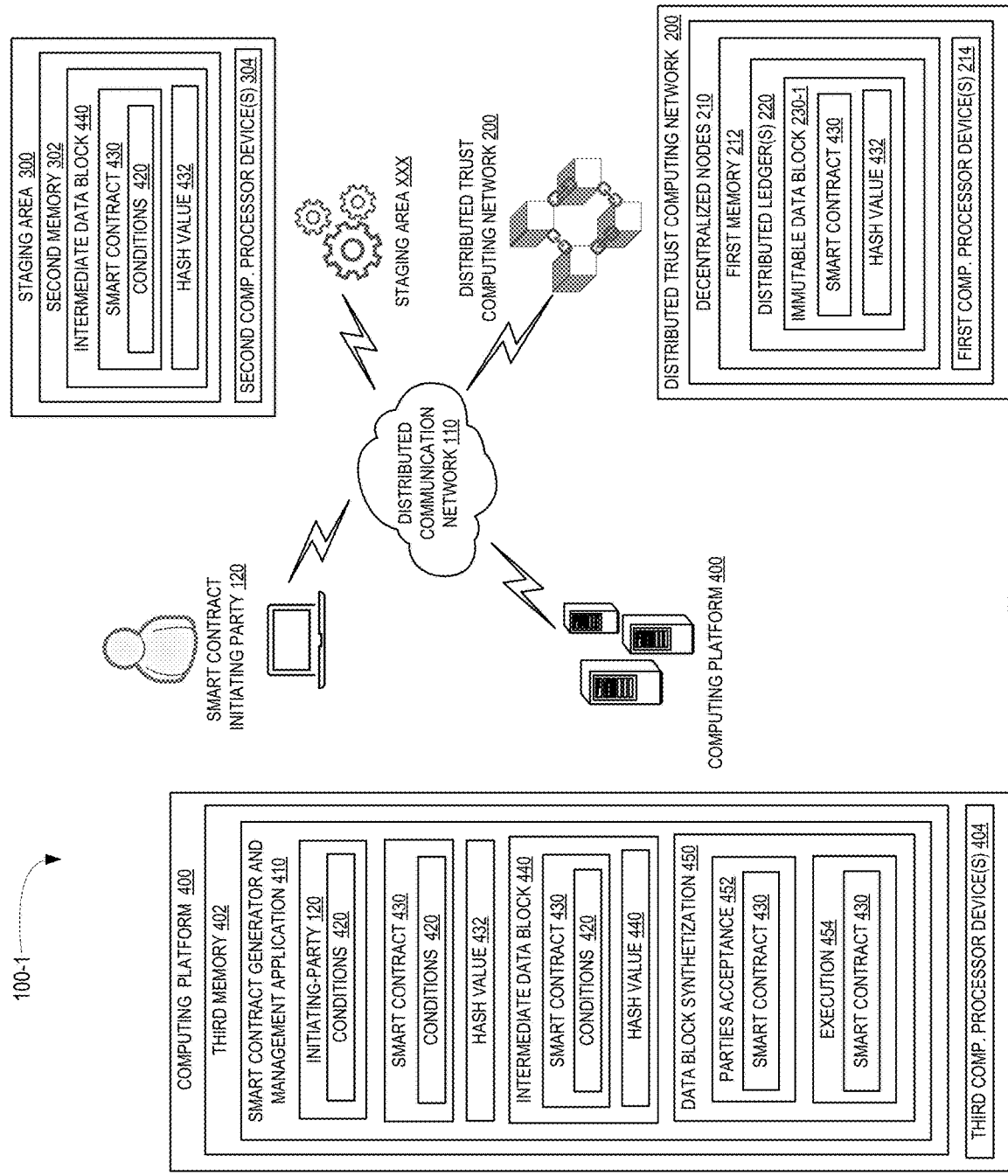
Figure 3:
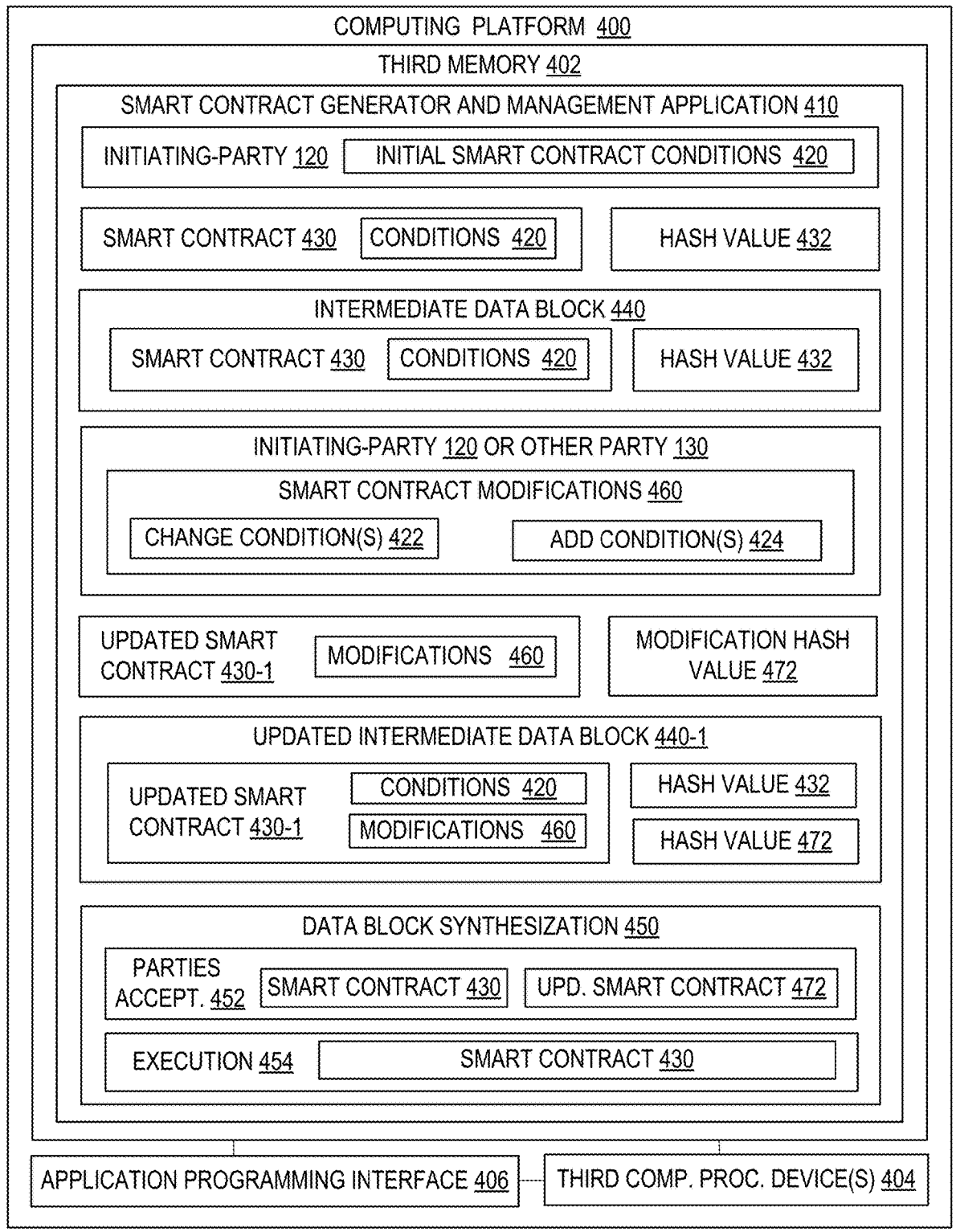
Figure 4:
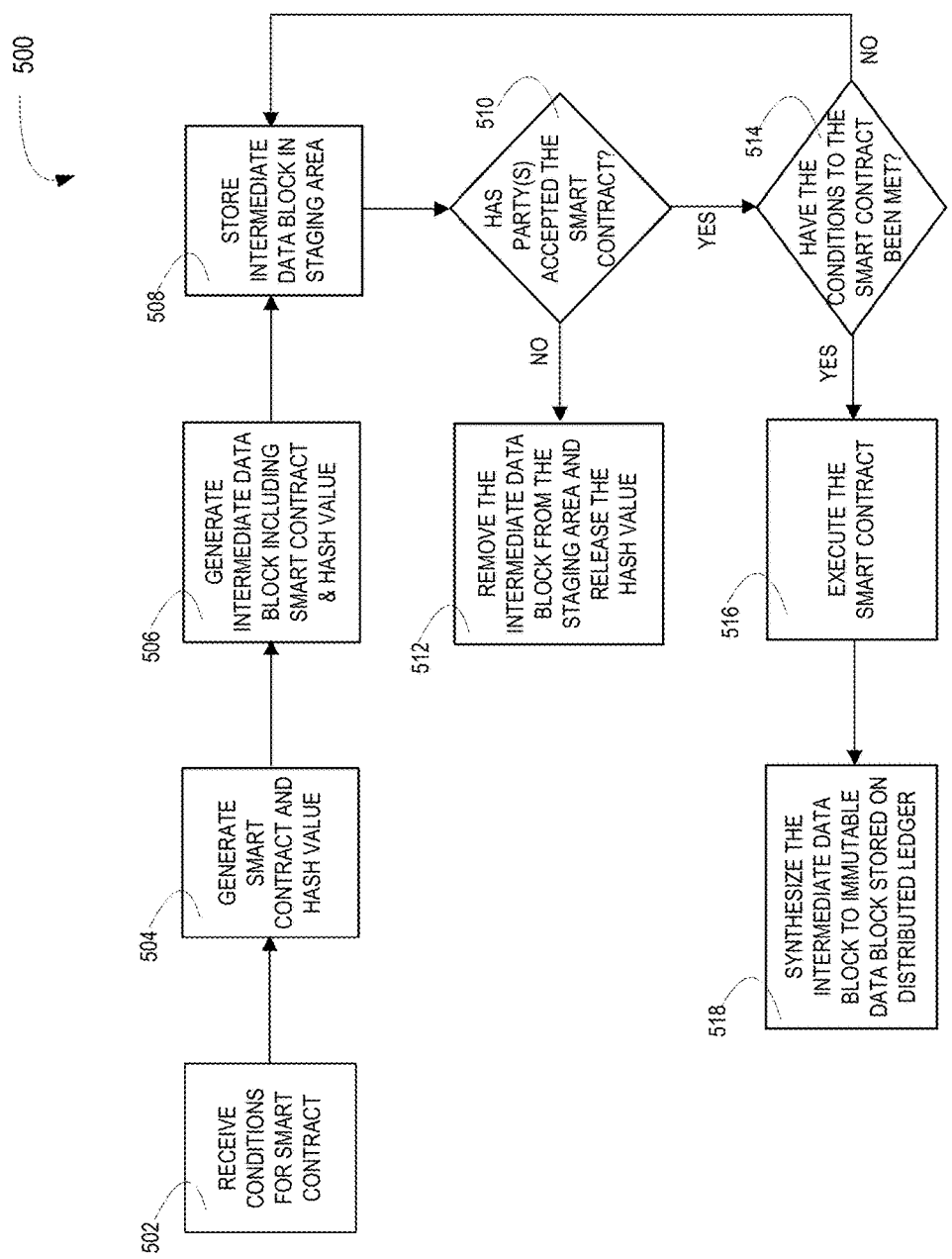
Figure 5:
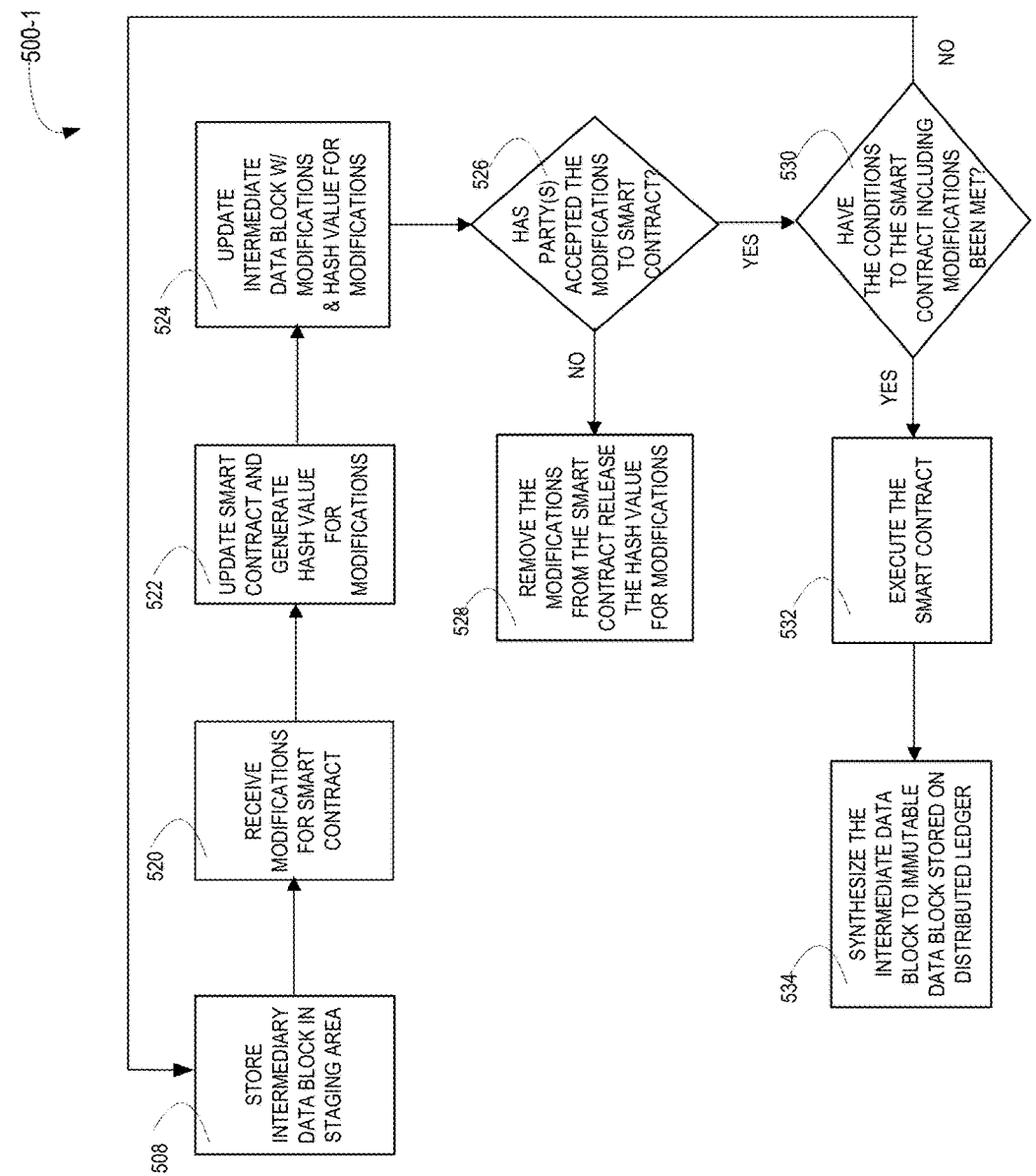
Figure 6:
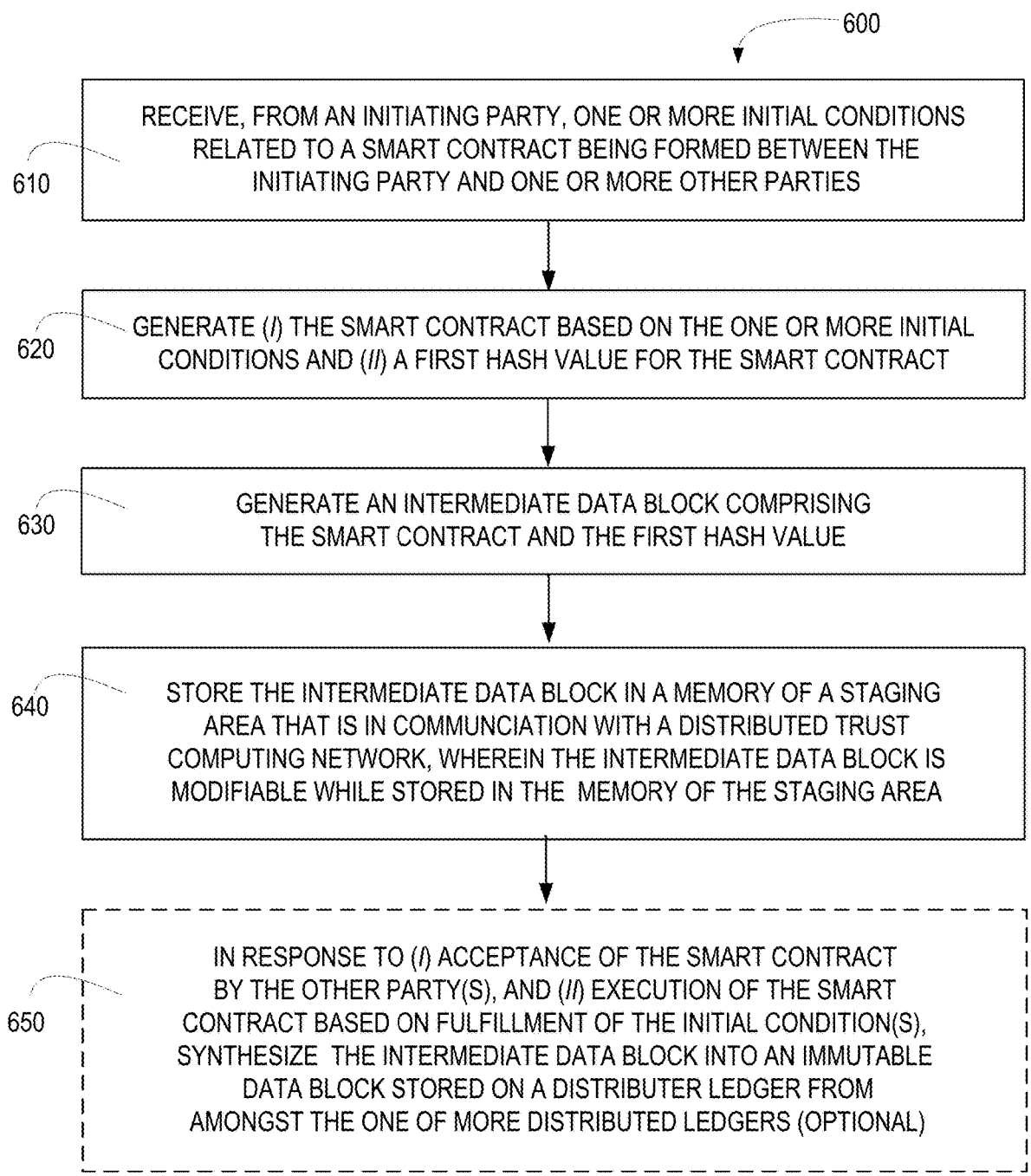

Having thus described embodiments of the disclosure in general terms, reference will now be made to the accompanying drawings, wherein:

FIG. 1 is a schematic/block diagram of a system for generating and managing smart contracts in a distributed trust computing environment, in accordance with embodiments of the present invention;

FIG. 2 is a schematic/block diagram of an alternate system for generating and managing smart contracts in a distributed trust computing environment, in accordance with embodiments of the present invention;

FIG. 3 is a block diagram of a computing platform including a smart contract generator and management application, in accordance with embodiments of the present invention;

FIG. 4 is a flow diagram of a method for generating a smart, storing the smart contract as a modifiable intermediate data block within a staging area and, upon acceptance and execution of the smart contract, synthesizing the intermediate data block into an immutable data block stored on a distributed ledger of a distributed trust computing network, in accordance with embodiments of the present invention;

FIG. 5 is a flow diagram of a method for modifying a smart contract stored as an intermediate data block within a staging area prior to synthesizing the intermediate data block into an immutable data block stored on a distributed ledger of a distributed trust computing network, in accordance with embodiments of the present invention; and FIG. 6 is a flow diagram of a method for method for generating a smart, storing the smart contract as a modifiable intermediate data block within a staging area and, upon acceptance and execution of the smart contract, synthesizing the intermediate data block into an immutable data block stored on a distributed ledger of a distributed trust computing network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for enabling modifications to smart contracts within a distributed trust computing network platform. Specifically, embodiments provide for generating a smart contract and an associated hash value, which are stored in an intermediate data block held within a staging area. The intermediate data block is held in the staging area until (i) all the parties accept the smart contract and (ii) the conditions are met and the smart contract self-executes. As long as the intermediate data block remains in the staging area, the data stored therein is subject to modification (e.g., conditions and/or parties can be changed, added or deleted). For example, in those embodiments of the invention in which the smart contract is an electronic check (i.e., e-check) in which payment is due in ninety days, the e-check may be modified (e.g., payment date changed, parties changed, endorsement of the e-check to a third-party or the like) during the ninety day period and the modifications stored in the corresponding intermediate data block within the staging area.

Once the parties to the smart contract accept the smart contract (and, in some embodiments modifications to the smart contact) and the conditions are met, such that the smart contact self-executes, the intermediate data block is synthesized (i.e., transformed) into an immutable data block which is stored within a distributed ledger of the corresponding distributed trust computing network. Once the data block has been synthesized/transformed, the data stored therein is no longer modifiable and, thus, is deemed to be immutable. For example, in those embodiments of the invention in which the smart contract is an electronic check (i.e., e-check) in which payment is due in ninety days, once the ninety days have elapsed, payment is made and the corresponding intermediate data block is synthesized/transformed into an immutable data block stored within a distributed ledger.

In specific embodiments of the invention, in the event that a party to the smart contract cancels the smart contract or otherwise declines the conditions defined by the smart contract including modifications to the conditions, the intermediate data block is removed from the staging area or the modifications are removed from the intermediate data block and corresponding hash value (i.e., the initial hash value for the smart contract or the hash value for the modification(s) is released. Releasing the hash value means that the hash value is subject to subsequent re-generation by the corresponding hash algorithm and can be re-used as the hash value for a subsequently generated data block.

Referring to FIG. 1, a schematic/block diagram is presented of a system 100 for generation and management of a smart contract in a distributed trust computing platform, in accordance with embodiments of the invention. The system 100 is implemented within a distributed communication network 110, which may comprise the Internet, one or more intranets, one or more cellular networks or other wired and/or wireless communications networks. The system 100 includes a distributed trust computing network 200, one example of which is a blockchain network. Distributed trust computing network 200 includes a plurality of decentralized nodes 210, each node 210 having a first memory 212 and one or more first computing processor devices 214 in communication with first memory 212. The decentralized nodes 210 collectively store, in first memory 212, distributed ledgers 220 which comprise a series of immutable data blocks 230. Each immutable data block 230 storing data 232 that has been verified through a consensus process performed by a plurality of the decentralized nodes 210.

System 100 additionally includes a staging area 300 that is in network communication with the distributed trust computing network 200. Staging area 300 includes second memory 302 and one or more second computing processor devices 304 in communication with second memory 302 and configured for storing data to and retrieving data from second memory 302.

In addition, system 100 includes computing platform 400, which may comprise application server(s) or the like. Computing platform 400 includes third memory 402 and one or more third computing processor devices 404 in communication with third memory 402. Third memory 402 stores smart contract generation and management application 410 that is executable by at least one of the third computing processors 404. Smart contract generation and management application 410 is configured to receive, from smart contract-initiating party 120, one or more initial conditions 420 related to a smart contract to be formed between the initiating party 120 and one or more other parties 130. In response to receiving initial condition(s) 420, smart contract generation and management application 410 is configured to generate (i) the smart contract 430 based on the initial conditions 420 and (ii) a first hash value 432 for the smart contract 430 (i.e., for the data block storing the smart contract 430. In response to generating (i) the smart contract and (ii) the first hash value 432, smart contract generation and management application 410 is further configured to generate an intermediate data block 440 that includes the smart contract 430 and the first hash value 432 and store intermediate data block 440 in the second memory 302 of the staging area 300. The intermediate data block 440 is modifiable while stored in the second memory 302 of the staging area 300 (i.e., prior to synthesizing/transforming the intermediate data block 440 into an immutable data block 230 stored within a distributed ledger 220 of the distributed trust computing network 200. Modification of the intermediate data block 440 includes, but is not limited to, changing conditions 420, adding conditions 420, deleting conditions 420 or the like, which may include changing, adding or deleting parties 120/130 to the smart contract 430.

Referring to FIG. 2, a schematic/block diagram is presented of a system 100-1 for generating and managing a smart contract within a distributed trust computing platform, in accordance with embodiments of the present invention. System 100-2 includes at least some of the features shown and described in relation to FIG. 1 and, as such, those features will not be discussed herein in relation to FIG. 2. Smart contract generation and management application 410 is further configured to, in response to (i) parties acceptance 452 of the smart contract 430 and (ii) execution 454 of smart contract based on fulfillment of the initial condition(s) 420, perform data block synthetization 450 in which the intermediate data block 440 is synthesized/transformed into an immutable data block 230-1 stored on one of the distributed ledgers 220 of the distributed trust computing network 200. In this regard, the intermediary data block 440 is removed from the staging area 300 and the smart contract stored in the immutable data block 220 becomes immutable, meaning the smart contract cannot be modifiable and the contents of which can not be challenged.

Referring to FIG. 3, a block diagram is presented of computing platform 400, in accordance with embodiments of the present invention. In addition to providing greater details of computing platform 400, FIG. 3 highlights various alternate embodiments of the invention. Computing platform 400 may comprise one or, typically, multiple devices, such as application servers and the like. Computing platform 400 includes third memory 402, which may comprise volatile and/or non-volatile memory, such as read-only memory (ROM) and/or random-access memory (RAM), EPROM, EEPROM, flash cards, or any memory common to computing platforms. Moreover, third memory 402 may comprise cloud storage, such as provided by a cloud storage service and/or a cloud connection service.

Further, computing platform 400 includes one or more third computing processor devices 404, which may be an application-specific integrated circuit ("ASIC"), or other chipset, logic circuit, or other data processing device. Third computing processing device(s) 404 may execute one or more application programming interface (APIs) 406 that interface with any resident programs, such as smart contract generation and management application 410 or the like, stored in third memory 402 of computing platform 400 and any external programs. Computing platform 400 may include various processing subsystems (not shown in FIG. 3) embodied in hardware, firmware, software, and combinations thereof, that enable the functionality of computing platform 400 and the operability of computing platform 400 on a distributed communication network 110 (shown in FIGS. 1-2), such as the Internet, intranet(s), cellular network (s) and the like. For example, processing subsystems allow for initiating and maintaining communications and exchanging data with other networked devices. For the disclosed aspects, processing subsystems of computing platform 400 may include any subsystem used in conjunction with smart contract generation and management application 410 and related tools, routines, sub-routines, applications, sub-applications, sub-modules thereof.

In specific embodiments of the present invention, computing platform 400 additionally includes a communications module (not shown in FIG. 3) embodied in hardware, firmware, software, and combinations thereof, that enables electronic communications between components of computing platform 400 and other networks and network devices. Thus, communication module may include the requisite hardware, firmware, software and/or combinations thereof for establishing and maintaining a network communication connection with one or more devices and/or networks.

As previously discussed in relation to FIG. 1, third memory 402 stores smart contract generation and management application 410 that is executable by at least one of the third computing processors 404. Smart contract generation and management application 410 is configured to receive, from smart contract-initiating party 120, one or more initial conditions 420 related to a smart contract to be formed between the initiating party 120 and one or more other parties 130. In those embodiments of the invention, in which the smart contract 430 is an electronic-check (i.e., e-check) the conditions may include payee (i.e., other party), payment due date (e.g., on-demand or future payment date), payment account, payee account and the like.

In response to receiving initial condition(s) 420, smart contract generation and management application 410 is configured to generate (i) the smart contract 430 based on the initial conditions 420 and (ii) a first hash value 432 for the smart contract 430 (i.e., for the data block storing the smart contract 430. In response to generating (i) the smart contract 430 and (ii) the first hash value 432, smart contract generation and management application 410 is further configured to generate an intermediate data block 440 that includes the smart contract 430 and the first hash value 432 and store intermediate data block 440 in the second memory 302 of the staging area 300. The intermediate data block 440 is modifiable while stored in the second memory 302 of the staging area 300 (i.e., prior to synthesizing/transforming the intermediate data block 440 into an immutable data block 230 stored within a distributed ledger 220 of the distributed trust computing network 200.

Thus, smart contract generation and management application 410 is further configured to receive, from the initiating-party 120 or other party 130, smart contract modifications 460 which may include (i) changes 422 to the initial conditions 420 (including deletion) and/or (ii) addition 424 to the initial conditions 420. In those embodiments of the invention, in which the smart contract is an e-check, the changes 422 to the initial conditions 40 may include changes to the payment due date (e.g., initial condition called for payment in 30 days and modification calls for immediate/on-demand payment) and additions 424 to the initial conditions 420 may include endorsement of the check to another party (e.g., original payee endorses the e-check for payment to another previously unnamed party).

In response to receiving the smart contract modifications 460, smart contract generation and management application 410 is configured to update the smart contract 430 to include the modifications (resulting in updated smart contract 430-1) and generate a second hash value 472 for the smart contract modifications 472. In response to updating the smart contract 430 and generating the second hash value 472, smart contract generation and management application 410 is further configured to update intermediate data block 440 (resulting in updated intermediate data block 440-1) that includes the updated smart contract 430-1 (including initial conditions 420 and modifications 460) and the first and second hash value 432 and 472.

As discussed in relation to FIG. 2, smart contract generation and management application 410 is further configured to, in response to (i) parties acceptance 452 of the smart contract 430 and, where applicable parties affected by the modifications acceptance of the updated smart contract 472 and (ii) execution 454 of smart contract based on fulfillment of the initial condition(s) 420 and any modifications 460, perform data block synthetization 450 in which the intermediate data block 440 is synthesized/transformed into an immutable data block 230-1 stored on one of the distributed ledgers 220 of the distributed trust computing network 200. In this regard, the intermediary data block 440 is removed from the staging area 300 and the smart contract stored in the immutable data block 220 becomes immutable. It should be noted that a party affected by a modification 460 may decline the modification 460 (i.e., not accept); however, the underlying smart contract 430 remains in enforce. For example, in those embodiments of the invention in which the smart contract 430 is an e-check, the initial payee may provide modifications to the smart contract in the form of attempting to endorse the check for payment to another party. However, the other party may decline the endorsement, which means that although the modifications will not take effect, the payor is still obligated to pay the initial party under the conditions of the initial smart contract.

Referring to FIG. 4, a flow diagram is presented of a method 500 for generating a smart, storing the smart contract as a modifiable intermediate data block within a staging area and, upon acceptance and execution of the smart contract, synthesizing the intermediate data block into an immutable data block stored on a distributed ledger of a distributed trust computing network, in accordance with embodiments of the present invention. At Event 502, conditions for a smart contract are received from a smart contract-initiating party and, at Event 504, a smart contract is generated based on the received conditions and a has value is generated for the smart contract.

At Event 506, an intermediate data block is generated that includes the smart contract and the corresponding hash value and, at Event 508, the intermediate data block is stored in a staging area, which allows for the intermediate data block to be modifiable prior to synthesizing the intermediate data block into an immutable data block stored on a distributed ledger of a distributed trust computing network.

At Decision 510, a determination is made as to whether parties to the smart contract (other than the initiating party) have accepted the smart contact. If a determination is made that one or more parties to the smart contract do not accept (i.e., decline the smart contract) or the smart contract is otherwise cancelled prior to execution, at Event 512, the intermediate data block is removed from the staging area and the hash value is released, which means the hash-value is subject to re-generation by the hash algorithm and once re-generated may be assigned to a subsequently generated data block or data entry. If a determination is made that all parties to the smart contract have accepted the smart contract, at Decision 514, a determination is made as to whether the conditions to the smart contract have been met. If a determination is made that the conditions to the smart contract have not been met, at Event 508, the smart contract remains in the staging area subject to modifications. If a determination is made that the conditions to the smart contract have been met, at Event 516, the smart contract is executed and, at Event 518, the intermediate data block is synthesized/transformed into an immutable data block through storage of the data block on a distributed ledger of a corresponding distributed trust computing network.

Referring to FIG. 5, a flow diagram is presented of a method 500-1 for modifying a smart contract stored as an intermediate data block within a staging area prior to synthesizing the intermediate data block into an immutable data block stored on a distributed ledger of a distributed trust computing network, in accordance with embodiments of the present invention. At Event 508 (as shown and described in relation to the method 500 of FIG. 4), an intermediate data block including a smart contract and corresponding hash value is stored in a staging area. At Event 520, modifications to the smart contract are received and, at Event 522, the smart contract is updated to include the modifications and a new hash value is generated for the modifications. At Event 524, the intermediate data block is updated to include the updated smart contract and the newly generated hash value.

At Decision 526, a determination is made as to whether the party or parties affected by the modifications have accepted the modifications to the smart contract. If a determination is made that a party affected by the modifications has not accept the modification(s) (i.e., decline the modifications to smart contract), at Event 512, the modifications are removed from the smart contract, the intermediate data block is updated to the newly generated hash value corresponding to the modifications is released, which means the hash-value is subject to re-generation by the hash algorithm and once re-generated may be assigned to a subsequently generated data block or data entry. If a determination is made that all parties affected by the modification to the smart contract have accepted the modifications, at Decision 530, a determination is made as to whether the conditions to the smart contract have been met. If a determination is made that the conditions to the smart contract have not been met, at Event 508, the smart contract remains in the staging area subject to further modifications. If a determination is made that the conditions to the smart contract including conditions related to the modification(s) have been met, at Event 532, the smart contract is executed and, at Event 534, the intermediate data block is synthesized/transformed into an immutable data block through storage of the data block on a distributed ledger of a corresponding distributed trust computing network.

Referring to FIG. 6, a flow diagram is presented of a method 600 for generating and managing a smart contract within a distributed trust computing platform, in accordance with embodiments of the present invention. At Event 610, one or more initial conditions related to a smart contract are received from a smart contract-initiating party. In response to receiving initial condition(s), at Event 620, a smart contract is generated based on the initial conditions and a first hash value is generated for the smart contract. In response to generating (i) the smart contract and (ii) the first hash value, at Event 630, an intermediate data block is generated that includes the smart contract and the first hash value and, at Event 640, the intermediate data block is stored in the memory of a staging area. In specific embodiments of the method, consensus (i.e., validation of the data block contents) is received on the intermediate data block from at least two of the plurality of decentralized nodes prior to storing the intermediate data block in the second memory of the staging area. The intermediate data block being modifiable while stored in the memory of the staging area. Modification of the intermediate data block may include, but is not limited to, changing conditions, adding conditions, deleting conditions or the like, which may include changing, adding or deleting parties to the smart contract, performance due date(s) and the like.

In response to (i) acceptance of the smart contract by all of the parties and (ii) execution of the smart contract based on fulfillment of one or more of the initial conditions, at optional Event 650, the intermediate data block is synthesized/transformed into a an immutable data block by storing the data block on a distributed ledger of a corresponding distributed trust computing network.

Thus, present embodiments of the invention discussed in detail above, provide for enabling modifications to smart contracts within a distributed trust computing network platform. Specifically, enablement of smart contract modifications is made possible by generating a smart contract and an associated hash value and storing such in an intermediate data block held within a staging area. The intermediate data block is held in the staging area until (i) all the parties accept the smart contract and (ii) the conditions are met and the smart contract self-executes. As long as the intermediate data block remains in the staging area, the data stored therein is subject to modification (e.g., conditions and/or parties can be changed, added or deleted). Once the parties to the smart contract accept the smart contract (and, in some embodiments modifications to the smart contact) and the conditions are met, such that the smart contact self-executes, the intermediate data block is synthesized (i.e., transformed) into an immutable data block which is stored within a distributed ledger of the corresponding distributed trust computing network.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing a smart contract in a distributed trust computing network, the system comprising:
   a distributed trust computing network comprising a plurality of decentralized nodes, each decentralized node including first memory and at least one first computing processor device in communication with the first memory, wherein the first memory of the decentralized nodes is configured to store one or more distributed ledgers, each distributed ledger comprising a plurality of immutable data blocks that store data;
   a staging area in communication with the distributed trust computing network and comprising second memory and at least one second computing processor device in communication with the second memory; and
   a computing platform including third memory and at least one third computing processor device in communication with the third memory, wherein the third memory stores smart contract generator and management application that is executable by one or more of the at least one third computing processor devices and configured to:
      receive, from an initiating party, one or more initial conditions related to a smart contract being formed between the initiating party and one or more other parties,
      generate (i) the smart contract based on the one or more initial conditions and (ii) a first hash value for the smart contract,
      generate an intermediate data block comprising the smart contract and the first hash value;
      store the intermediate data block in the second memory of the staging area, wherein the intermediate data block is modifiable while stored in the second memory of the staging area;
      receive, from the initiating party or one of the one or more other parties, a user input indicating cancellation or declination of the smart contract, and
      in response to receiving the user input, remove the intermediate block from the second memory of the staging area and release the first hash value for subsequent re-generation and re-use as a hash value for a later generated data block.

2. The system of claim 1, wherein the smart contract generator and management application is further configured to:

in response to (i) acceptance of the smart contract by the one or more other parties, and (ii) execution of the smart contract based on fulfillment of the one or more initial conditions, synthesize the intermediate data block into an immutable data block stored on a distributed ledger from amongst the one of more distributed ledgers.

3. The system of claim 1, wherein the smart contract generator and management application is further configured to:

receive consensus on the intermediate data block from at least two of the plurality of decentralized nodes, wherein consensus is received prior to storing the intermediate data block in the second memory of the staging area.

4. The system of claim 1, wherein the smart contract generator and management application is further configured to:

prior to executing the smart contract, receive, from the initiating party or one of the one or more parties, one or more updates to the smart contract including at least one chosen from the group consisting of (i) one or more modifications to the one or more initial conditions of the smart contract and (ii) one or more additional conditions related to the smart contract, update the smart contract based on the one or more updates, generate a second hash value for the one or more updates, modify the intermediate data block stored in the second memory of the staging area to include the updated smart contract and the second hash value.

5. The system of claim 4, wherein the smart contract generator and management application is further configured to:

synthesize the modified intermediate data block into an immutable data block stored on a distributed ledger from amongst the one of more distributed ledgers in response to (i) acceptance of (a) the smart contract by the one or more other parties and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions.

6. The system of claim 4, wherein the smart contract generator and management application is further configured to:

receive, from a party to the smart contract affected by the one or more updates, a user input indicating declination of at least one of the one or more updates to the smart contract, and in response to receiving the user input, remove the at least one of the one or more updates from the intermediate data block stored in the second memory of the staging area and release the second hash value for subsequent re-generation and re-use as a hash value for a later generated data block.

7. A computer-implemented method for managing a smart contract in a distributed trust computing network, method being executable by one or more computing processor devices and comprising:

receiving, from an initiating party, one or more initial conditions related to a smart contract being formed between the initiating party and one or more other parties;

generating (i) the smart contract based on the one or more initial conditions and (ii) a first hash value for the smart contract;

generating an intermediate data block comprising the smart contract and the first hash value;

storing the intermediate data block in a memory of a staging area, wherein the intermediate data block is modifiable while stored in the memory of the staging area, wherein the staging area is in communication with a distributed trust computing network comprising a plurality of decentralized nodes, each decentralized node configured to store one or more distributed ledgers, each distributed ledger comprising a plurality of immutable data blocks that store data;

receiving, from the initiating party or one of the one or more other parties, a user input indicating cancellation or declination of the smart contract; and in response to receiving the user input, removing the intermediate block from the second memory of the staging area and release the first hash value for subsequent re-generation and re-use as a hash value for a later generated data block.

8. The computer-implemented method of claim 7, further comprising:

in response to (i) acceptance of the smart contract by the one or more other parties, and (ii) execution of the smart contract based on fulfillment of the one or more initial conditions, synthesizing the intermediate data block into an immutable data block stored on a distributed ledger from amongst the one of more distributed ledgers.

9. The computer-implemented method of claim 7, further comprising:

receiving consensus on the intermediate data block from at least two of the plurality of decentralized nodes, wherein consensus is received prior to storing the intermediate data block in the memory of the staging area.

10. The computer-implemented method of claim 7, further comprising:

prior to executing the smart contract, receiving, from the initiating party or one of the one or more parties, one or more updates to the smart contract including at least one chosen from the group consisting of (i) one or more modifications to the one or more initial conditions of the smart contract, and (ii) one or more additional conditions related to the smart contract;

updating the smart contract based on the one or more updates;

generating a second hash value for the one or more updates; and modifying the intermediate data block stored in the second memory of the staging area to include the updated smart contract and the second hash value.

11. The computer-implemented method of claim 10, further comprising:

synthesizing the modified intermediate data block into an immutable data block stored on a distributed ledger from amongst the one of more distributed ledgers in response to (i) acceptance of (a) the smart contract by the one or more other parties, and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions.

12. The computer-implemented method of claim 10, further comprising:
   receiving, from a party to the smart contract affected by the one or more updates, a user input indicating declination of at least one of the one or more updates to the smart contract; and
   in response to receiving the user input, removing the at least one of the one or more updates from the intermediate data block and releasing the second hash value for subsequent re-generation and re-use as a hash value for a later generated data block.

13. A computer program product comprising:
   a non-transitory computer-readable medium comprising sets of codes for causing one or more computing devices to:
   receive, from an initiating party, one or more initial conditions related to a smart contract being formed between the initiating party and one or more other parties;
   generate (i) the smart contract based on the one or more initial conditions and (ii) a first hash value for the smart contract;
   generate an intermediate data block comprising the smart contract and the first hash value;
   store the intermediate data block in a memory of a staging area, wherein the intermediate data block is modifiable while stored in the memory of the staging area, wherein the staging area is in communication with a distributed trust computing network comprising a plurality of decentralized nodes, each decentralized node configured to store one or more distributed ledgers, each distributed ledger comprising a plurality of immutable data blocks that store data;
   receive, from the initiating party or one of the one or more other parties, a user input indicating cancellation or declination of the smart contract; and
   in response to receiving the user input, remove the intermediate block from the second memory of the staging area and release the first hash value for subsequent re-generation and re-use as a hash value for a later generated data block.

14. The computer program product of claim 13, wherein the sets of codes further cause the one or more computing devices to:
   in response to (i) acceptance of the smart contract by the one or more other parties, and (ii) execution of the smart contract based on fulfillment of the one or more initial conditions, synthesize the intermediate data block into an immutable data block stored on a distributed ledger from amongst the one of more distributed ledgers.

15. The computer program product of claim 13, wherein the sets of codes further cause the one or more computing devices to:
   receive consensus on the intermediate data block from at least two of the plurality of decentralized nodes, wherein consensus is received prior to storing the intermediate data block in the memory of the staging area.

16. The computer program product of claim 13, wherein the sets of codes further cause the one or more computing devices to:
   prior to executing the smart contract, receive, from the initiating party or one of the one or more parties, one or more updates to the smart contract including at least one chosen from the group consisting of (i) one or more modifications to the one or more initial conditions of the smart contract, and (ii) one or more additional conditions related to the smart contract;
   update the smart contract based on the one or more updates;
   generate a second hash value for the one or more updates; and
   modify the intermediate data block stored in the second memory of the staging area to include the updated smart contract and the second hash value.

17. The computer program product of claim 16, wherein the sets of codes further cause the one or more computing devices to:
   synthesize the modified intermediate data block into an immutable data block stored on a distributed ledger from amongst the one of more distributed ledgers in response to (i) acceptance of (a) the smart contract by the one or more other parties, and (b) the one or more updates to the smart contract by one or more parties to the smart contract affected by the one or more updates, and (ii) execution of the updated smart contract based on fulfillment of the one or more conditions including the at least one of the one or modified conditions or the one or more additional conditions.

* * * * *